United States Patent Office 3,251,836
Patented May 17, 1966

3,251,836
OXAZOLIDONE DERIVATIVES AND THEIR PREPARATION
Edmundo Fischer, Jorge L. J. Szabo, and Pedro Pal Stark, Buenos Aires, Argentina, assignors to Szabo Hnos. Kessler & Cia. S.R.L., Buenos Aires, Argentina, a company of Argentina
No Drawing. Filed Sept. 26, 1961, Ser. No. 140,677
1 Claim. (Cl. 260—243)

The present invention relates to oxazolidone derivatives and their preparation and more particularly to phenyloxymethyl phenylthiomethyl and phenothiazinomethyl-oxazolidones.

The new compounds respond to the formulas:

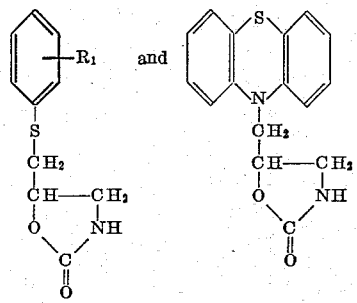

wherein $R_1$ is selected from the group consisting of 2-methyl, 3-methyl, 4-methyl, 2-methoxy and 2-tertiary butyl.

Specific compounds typical of the present invention are as follows:

5-(o-methyl-phenylthiomethyl)-2-oxazolidone
5-(m-methyl-phenylthiomethyl)-2-oxazolidone
5-(p-methyl-phenylthiomethyl)-2-oxazolidone
5-(o-methoxy-phenylthiomethyl)-2-oxazolidone
5-(o-tertiary butyl-phenylthiomethyl)-2-oxazolidone
5-phenylthiomethyl-oxazolidone-2

N-oxazolidinonyl-phenothiazine of the formula:

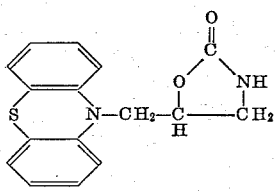

The oxazolidone derivatives of the invention are useful as analgesics, tranquilizers and central nervous system depressants. They may be used both in humans and in other animals for these purposes, and in the form of capsules, tablets and powders for oral administration.

The new oxazolidone derivatives are made by reacting 5-chloromethyl-2-oxazolidone with the corresponding phenols, and phenothiazines.

The reaction may be represented as follows:

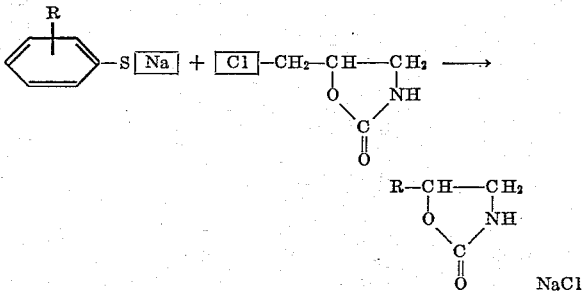

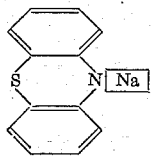

$R_1$ is selected from the group consisting of $R_1$ phenylthiomethyl and phenothiazine. $R_1$ is the hydrogen atom, 2-methyl, 3-methyl, 4-methyl, 2-methoxy, or 2-tertiary butyl groups.

For example, 5-(o-methoxy-phenylthiomethyl)-2-oxazolidone, having a melting point of 125° C., is made by placing equimolar amounts of 5-chloromethyl-2 oxazolidone and 5-o-methyl phenyl mercaptan in a one-litre balloon flask where they are mixed and refluxed for about 20 hours. During the reaction a grey precipitate forms and when the reaction is complete the grey precipitate is filtered out and discarded. The clear filtrate is neutralized with hydrochloric acid and then reduced in volume by concentration and then it is allowed to stand for about 24 hours, whereupon a white precipitate appears which is filtered out and recrystallized twice in ethanol. Additional quantities are obtained by concentrating the mother liquors almost until dryness, whereupon a grey precipitate forms which is recrystallized three times from absolute ethanol. The combined precipitates are mixed and dried over a dehydrating agent such as calcium chloride.

The invention is further illustrated by the following non-limitative examples:

Example 1

11.0 g. (0.1 mol) of thiophenol is dissolved in 200 ml. of absolute ethanol. Then 4.4 g. (0.11 mol) of NaCl and 13.5 g. of 5-chloromethyl-2-oxazolidone are added and the whole refluxed for 20 hours, neutralized with HCl (10%) and filtered. The inorganic precipitate (NaCl) is discarded. The liquid is concentrated to $1/10$ its volume and is left to crystallize. The crystals are purified by recrystallization. Yield: 8.5 g. (40%). M.P. 68° C. (uncorr.).

Example 2

17 g. (0.15 mol) of o-methylthiophenol is dissolved in 800 ml. of alcohol (96%). 7 g. (0.17 mol) of NaOH and 19 g. (0.15 mol) of 5-chloromethyl-2-oxazolidone are added and the whole refluxed for 20 hours, neutralized with HCl (10%) and filtered. The solution is concentrated to $1/10$ its volume obtaining an oil that is extracted several times with boiling water. It is recrystallized from water and alcohol, obtaining 12.5 g. of substance of M.P. 94–95° C. (uncorr.). Yield 46%.

Example 3

20 g. (0.16 mol) of m-methyl thiophenol is dissolved in 800 ml. absolute ethanol and 7 g. (0.176 mol) of NaOH and 21 g. (0.16 mol) of 5-chloromethyl-2-oxazolidone are added. The whole is refluxed for 15 hours and a grey precipitate is formed. It is neutralized and filtered. The precipitate is NaCl which is discarded. The liquid is concentrated to $1/4$ its volume and is left to crystallize. The crystals obtained are purified. The substance melts at 89–90° C. (uncorr.). Yield: 6 g. (27%).

Example 4

20 g. (0.16 mol) of p-methylthiophenol is dissolved in 600 ml. of ethanol and 7 g. (0.176 mol) of NaOH and 21 g. (0.16 mol) of 5-chloromethyl-2-oxazolidone are added. The whole is refluxed during 25 hours, neutralized and filtered. The filtrate is concentrated to $1/10$ its volume. The oil is extracted several times with boiling water and recrystallized. M.P. 68–70° C. (uncorr.).

Example 5

25 g. (0.18 mol) of o-methoxythiophenol is dissolved in 950 ml. absolute ethanol and 8.0 g. (0.20 mol) of NaOH and 23 g. (0.18 mol) of 5-chloromethyl-2-oxazolidone are added. The whole is refluxed during 20 hours, neutralized and the precipitate formed is filtered out and discarded. The filtrate is concentrated to 1/10 its volume, left to crystallize and then recrystallized, obtaining 8.6 g. of crystalline powder of M.P. 125° C. (uncorr.). Yield 20%.

Example 6

20.5 g. (0.15 mol) of thioxylenol (Fallek Chem. Corp.) is dissolved in 800 ml. of absolute ethanol and 6.6 g. (0.165 mol) of NaOH and 20 g. of 5-chloromethyl-2-oxazolidone are added. The whole is refluxed during 20 hours, neutralized, filtered and the precipitate (NaCl) is discarded. An oil is formed which is extracted and recrystallized.

Example 7

24 g. (0.15 mol) of p-tert. butylthiophenol is dissolved in 800 ml. of absolute ethanol and 20 g. of 5-chloromethyl-2-oxazolidone and 6 g. (0.15 mol) of NaOH are added and the whole refluxed during 20 hours, neutralized and filtered. The precipitate is discarded and the filtrate is concentrated to 1/10 its volume and recrystallized from alcohol. 8.5 g. (32%) of very bright crystals are obtained of M.P. 87° C. (uncorr.).

Example 8

22.5 g. (0.15 mol) of 2-isopropyl-5-methylphenol are dissolved in 1 litre of ethanol and 20 g. (0.15 mol) of 5-chloromethyl-2-oxazolidone and 6 g. of NaOH are added. The whole is refluxed during 23 hours, neutralized and then filtered. The precipitate (NaCl) is discarded. The liquid is concentrated and recrystallized in boiling water. Bright laminas of M.P. 125–27° C. (uncorr.) are obtained. Yield: 9.3 g. (37%).

Example 9

50 g. (0.25 mol) of phenothiazine is dissolved in benzene and 12 g. (0.3 mol) of NaOH and 34 g. (0.25 mol) of 5-chloromethyl-2-oxazolidone are added. The whole is shaken and refluxed until no water can be separated by using an apparatus to determine water. The reflux is continued during five hours. The product (M.P. 196° C.) is recrystallized several times in toluene and in water (uncorr.). 16 g. (35%) of greenish-white crystals are obtained.

What is claimed is:
The compound of the formula

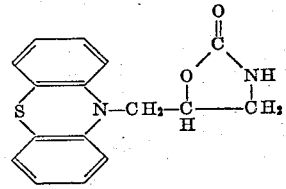

References Cited by the Examiner

UNITED STATES PATENTS

| | | | |
|---|---|---|---|
| 3,062,826 | 11/1962 | Lunsford | 260—307.3 |
| 3,062,827 | 11/1962 | Lunsford | 260—307.3 |

FOREIGN PATENTS

| | | |
|---|---|---|
| 570,147 | 8/1958 | Belgium. |
| 823,733 | 11/1959 | Great Britain. |
| 838,759 | 6/1960 | Great Britain. |

OTHER REFERENCES

Fischer et al.: Nature, vol. 186, pp. 893–4 (June 11, 1960).

Fromm et al.: Annalen der Chemie, vol. 442, pp. 130–1, 134 and 143 (1925).

Fromm et al.: Annalen der Chemie, vol. 467, pp. 240–1 and 255 (1928).

Lowy et al.: An Introduction to Organic Chemistry, 6th ed., p. 213 (1945).

Lunsford et al.: J. of the Am. Chem. Soc., vol. 82, pp. 1166 to 1171 (Mar. 5, 1960).

IRVING MARCUS, *Primary Examiner.*

NICHOLAS RIZZO, WALTER A. MODANCE,
*Examiners.*